(12) United States Patent
Joshi et al.

(10) Patent No.: US 6,839,894 B1
(45) Date of Patent: Jan. 4, 2005

(54) METHOD AND APPARATUS FOR DEBUGGING A SOFTWARE PROGRAM USING DYNAMIC DEBUG PATCHES AND COPY ON WRITE VIEWS

(75) Inventors: Vikram Joshi, Los Gatos, CA (US); Alex Tsukerman, Foster City, CA (US); Shari Yamaguchi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

(21) Appl. No.: 09/717,187

(22) Filed: Nov. 20, 2000

Related U.S. Application Data
(60) Provisional application No. 60/166,598, filed on Nov. 19, 1999.

(51) Int. Cl.[7] .................................. G06F 9/44
(52) U.S. Cl. ....................................... 717/130
(58) Field of Search ............... 717/124–129, 717/168–172; 707/8, 10, 20, 205; 700/200; 349/110

(56) References Cited

U.S. PATENT DOCUMENTS

| | | | |
|---|---|---|---|
| 5,129,082 A | | 7/1992 | Tirfing et al. |
| 5,197,005 A | | 3/1993 | Shwartz et al. |
| 5,303,379 A | * | 4/1994 | Khoyi et al. ............... 717/166 |
| 5,437,027 A | | 7/1995 | Bannon et al. |
| 5,561,763 A | | 10/1996 | Eto et al. |
| 5,613,098 A | | 3/1997 | Landau et al. |

(List continued on next page.)

OTHER PUBLICATIONS

Sun Solaris 2.6 Reference Manual Answer Book, man Pages (3): Library Routines (pp. 1–5).

*Primary Examiner*—Kakali Chaki
*Assistant Examiner*—Tuan Anh Vu
(74) *Attorney, Agent, or Firm*—Hickman Palermo Truong & Becker LLP; Edward A. Becker

(57) ABSTRACT

A method and apparatus for debugging a software program is provided that is non-intrusive and allows multiple persons to debug concurrently in view private sessions. In one example, a method includes preserving a memory state of a portion of a software program, such as a database system. A second software program is compiled and dynamically linked, and which when executed, would normally cause modification to targeted data in the preserved portion of the software program. The second software program is executed by making a copy of the targeted data in the preserved portion of the software program. The copy is modified to generate a modified copy of the targeted data without modifying the data that is in the preserved portion of the software program. In subsequent accesses, the user that issued that executed the second software program accesses the modified copy whenever the user would have otherwise accessed the corresponding preserved portion. The second software program is made accessible to other users of the database system by publishing in the preserved portion a corresponding symbolic name associated with the second software program. If another user accesses the second software program and executes it, then another copy of the targeted data is made for that user. As before the copy is modified to generate a modified copy of the targeted data without modifying the data that is in the preserved portion of the software program.

24 Claims, 3 Drawing Sheets

U.S. PATENT DOCUMENTS

| | | | |
|---|---|---|---|
| 5,675,803 A * | 10/1997 | Preisler et al. | 717/131 |
| 5,781,776 A | 7/1998 | Johnston et al. | |
| 5,854,924 A | 12/1998 | Rickel et al. | |
| 5,946,689 A * | 8/1999 | Yanaka et al. | 707/10 |
| 5,950,198 A * | 9/1999 | Falls et al. | 707/8 |
| 5,974,418 A | 10/1999 | Blinn et al. | |
| 6,003,143 A | 12/1999 | Kim et al. | |
| 6,029,178 A * | 2/2000 | Martin et al. | 707/201 |
| 6,085,029 A | 7/2000 | Kolawa et al. | |
| 6,108,659 A | 8/2000 | Vincent | |
| 6,122,025 A * | 9/2000 | Kim | 349/110 |
| 6,163,858 A | 12/2000 | Bodamer | |
| 6,167,535 A | 12/2000 | Foote et al. | |
| 6,216,237 B1 | 4/2001 | Klemm et al. | |
| 6,226,787 B1 | 5/2001 | Serra et al. | |
| 6,263,491 B1 | 7/2001 | Hunt | |
| 6,330,670 B1 | 12/2001 | England et al. | |
| 6,374,268 B1 * | 4/2002 | Testardi | 707/205 |
| 6,378,124 B1 | 4/2002 | Bates et al. | |
| 6,397,125 B1 * | 5/2002 | Goldring et al. | 700/200 |
| 6,412,106 B1 | 6/2002 | Leask et al. | |
| 6,442,748 B1 * | 8/2002 | Bowman-Amuah | 717/108 |
| 6,463,578 B1 | 10/2002 | Johnson | |
| 6,490,721 B1 * | 12/2002 | Gorshkov et al. | 717/130 |
| 6,542,844 B1 | 4/2003 | Hanna | |
| 2003/0004952 A1 * | 1/2003 | Nixon et al. | 707/10 |

* cited by examiner

METHOD AND APPARATUS FOR DEBUGGING A SOFTWARE PROGRAM USING DYNAMIC DEBUG PATCHES AND COPY ON WRITE VIEWS

CROSS REFERENCE TO RELATED APPLICATIONS

This application is related to and claims domestic priority under 35 U.S.C. § 119(e) from prior U.S. Provisional Patent Application Ser. No. 60/166,598 filed on Nov. 19, 1999 entitled "Debugging Techniques And Fast SGA Dumps For Deferred Analysis Of The Database", by inventors Vikram Joshi, Alex Tsukerman, and Shari Yamaguchi, the entire disclosure of which is hereby incorporated by reference as if fully set forth herein.

This application is related to U.S. patent application Ser. No. 09/649,310 (now issued U.S. Pat. No. 6,667,825) filed on Aug. 28, 2000, entitled "Method And Apparatus For Debugging A Software Program", by inventors Vikram Joshi, Alex Tsukerman, and Shari Yamaguchi, the entire disclosure of which is hereby incorporated by reference as if fully set forth herein.

This application is related to U.S. patent application Ser. No. 09/717,162, now issued U.S. Pat. No. 6,671,826) filed on the same day herewith entitled "Fast Database State Dumps to File for Deferred Analysis of a Database", by inventors Vikram Joshi, Alex Tsukerman, and Shari Yamaguchi, the entire disclosure of which is hereby incorporated by reference as if fully set forth herein.

This application is related to U.S. patent application Ser. No. 09/717,161, (now issued U.S. Pat. No. 6,745,344) filed on the same day herewith entitled "A Debug and Data Collection Mechanism Utilizing a Difference in Database State By Using Consecutive Snapshots of the Database State", by inventors Vikram Joshi, Alex Tsukerman, and Shari Yamaguchi, the entire disclosure of which is hereby incorporated by reference as if fully set forth herein.

FIELD OF THE INVENTION

The present invention generally relates to debugging software programs and, more specifically, to techniques for debugging database systems.

BACKGROUND OF THE INVENTION

In a database system, an area of system memory is allocated and one or more processes are started to execute one or more transactions. The database server communicates with connected user processes and performs tasks on behalf of the user. These tasks typically include the execution of transactions. The combination of the allocated system memory and the processes executing transactions is commonly termed a database "server" or "instance".

Like most software systems, a database server has complicated shared memory structures. A shared memory structure contains data and control information for a portion of a database system. Because of software, hardware, or firmware bugs that may exist in a complex database system, shared memory structures may become logically incorrect. When structures become logically incorrect, the database system is likely to fail. Database failure is typically discovered in the following ways: by checking consistency of structures; by verifying certain assumptions; or by running into corrupted pointers. Attempting to process corrupted pointers will lead to a "crash," after which normal database operation is no longer possible.

A major responsibility of the database administrator is to be prepared for the possibility of hardware, software, network, process, or system failure. When shared structures are presumed to be corrupted, the best course of action for a database administrator is to cease further processing of the database. If a failure occurs such that the operation of a database system is affected, the administrator must usually recover the database and return the database to normal operations as quickly as possible. Recovery should protect the database and associated users from unnecessary problems and avoid or reduce the possibility of having to duplicate work manually.

Recovery operations vary depending on the type of failure that occurred, the structures affected, and the type of recovery that is performed. If no files are lost or damaged, recovery may amount to no more than rebooting the database system. On the other hand, if data has been lost, recovery requires additional steps in order to put the database back into normal working order.

Once the database is recovered or rebooted, the immediate problem is quickly resolved, but because the root cause is still undetermined and therefore unresolved, the error condition may resurface, potentially causing several additional outages. Therefore, it is still important to diagnose the state of the structures and data surrounding the database failure. Such a diagnosis may provide valuable information that can reduce the chance of failure in the future. As a practical matter, diagnosing the failure may lead to determining which vendor's hardware or software is responsible for the database failure. Such information is valuable for a vendor's peace of mind, if nothing else. Thus, competing with the goal of recovering the database as quickly as possible, is the goal of determining why the database system failed in the first place.

Unfortunately, even with traditional techniques of diagnosing a database failure, the system administrator is usually unable to obtain a sufficient amount of clues to determine why the failure happened. A deliberate and thorough diagnosis of the failure may require an unacceptable amount of database downtime. For example, any amount of downtime over 30 minutes may be extremely costly for a database that is associated with a highly active web site. Too much downtime may have unduly expensive business ramifications, such as lost revenue and damage to the reputation of the web site owner.

Another problem with traditional debugging techniques is that they can be intrusive. For example, a database system that supports the Structured Query Language (SQL) may be debugged by compiling SQL statements and running them against the database. The act of compiling and executing the SQL statements changes the state of the database system. Thus, the mere act of diagnosing the problem can easily cloud the problem or make the problem worse because diagnosis may involve altering the state of the database. Diagnosing the problem typically involves using debugging software, which calls for peeking and poking into data structures within the complex memory structures of the database systems. Although the data structures are best left untouched upon a failure, diagnosing the failure may involve working directly on the same data structures from which data is to be obtained. Nevertheless, it is important to preserve the original data and not change the data from its state at time of failure. A customer of the database may take issue to changing the database, because such a change may jeopardize or even destabilize their database system.

Effective diagnosis, however, requires getting as much information as possible out of the data structures. It may be useful here to refer to Heisenberg's uncertainty principle, which effectively states that the closer an object is analyzed, the more the object materially changes because the mere act of analyzing is intrusive. Applying this principle to the act of diagnosing a database failure, a typical debugging operation is naturally intrusive. Thus, it is difficult to be non-intrusive on a database and at the same time obtain a sufficient amount of meaningful data for debugging.

Traditional debugging techniques involve formatting certain parts of the database system and displaying this formatted portion in a human-readable form. This human-readable form can be set aside for later analysis, for example, after the database has been recovered or is no longer down. The entire memory of the database server is not dumped because an average database server is very large, typically between about 200 megabytes and about 100 gigabytes of unformatted binary and data. On the portion of the database that is formatted, an educated guess is made of the key data structures that are potential causes of the problem.

Unfortunately, such a debugging technique provides diagnosis only to the database server's end-memory state, which is the state after the database has been shutdown. Because the end-memory state is being analyzed separately from the database, the programmer performing the debugging does not have access to the real database and some of the database's persistent structures. Some of these persistent structures could be on disk or, in a multiple node system, on other nodes. For example, in a parallel server configuration, the persistent structures needed for debugging could reside on other servers. Thus, the technique of separately debugging portions of the database prevents the programmer from using the data that can only be obtained from the database itself.

Further, where debug operations are performed on the database while the database is down, multiple programmers cannot each privately diagnose the failure. Rather, the key data structures are typically diagnosed by having one programmer in front of a console inputting debug commands, while other programmers gather around issuing advice. Multiple programmers individually debugging the database is unadvisable using existing debugging techniques because the act of inputting debug commands is intrusive, as mentioned above. Each programmer's work would interfere with the concurrent debugging progress of fellow programmers.

For the foregoing reasons, what is needed is a method of debugging a software program, such as a database system, that is non-intrusive, yet allows for a comprehensive assessment of a failure.

SUMMARY OF THE INVENTION

Techniques are provided for allowing multiple persons to concurrently test software patches on a software program or debug a problem of the software program. Each person preferably has their own private view, which consists of (1) copied portions of the software program that reflect modifications made by that person, and (2) the portions of the preserved software program that the person has not modified. Providing a private view to each person allows each person to test and debug privately, independently, and concurrently with others. Each private view may be extensively explored and modified without affecting the memory state of the software program that existed at the time the software program was shutdown.

Accordingly, at any time, each private view may be refreshed to the state of the software program that existed at the time of shutdown. Faster diagnosis of the problem may therefore be accomplished because a debugger does not have to peek cautiously and slowly into the inner-workings of the software program. Similarly, the testing of various potential solutions to bugs in the program may be accomplished efficiently without affecting the memory state of the software program that existed at the time the software program was shutdown. Thus, where downtime of a software program must be kept to a minimum, the present techniques allow for performing quick and comprehensive diagnostics and testing of potential solutions to problems in the software program.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for non-intrusive testing of potential solutions for and debugging of a software program are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Testing and Diagnostic Technique

A database administrator may cause a database system to cease execution for a number of reasons, which are discussed above. Diagnosing a database will typically lead to modifying data in the database while it is down. As explained above, it is desirable to preserve the memory state that existed at the time of failure or at the time the database was shutdown.

Figure 1:
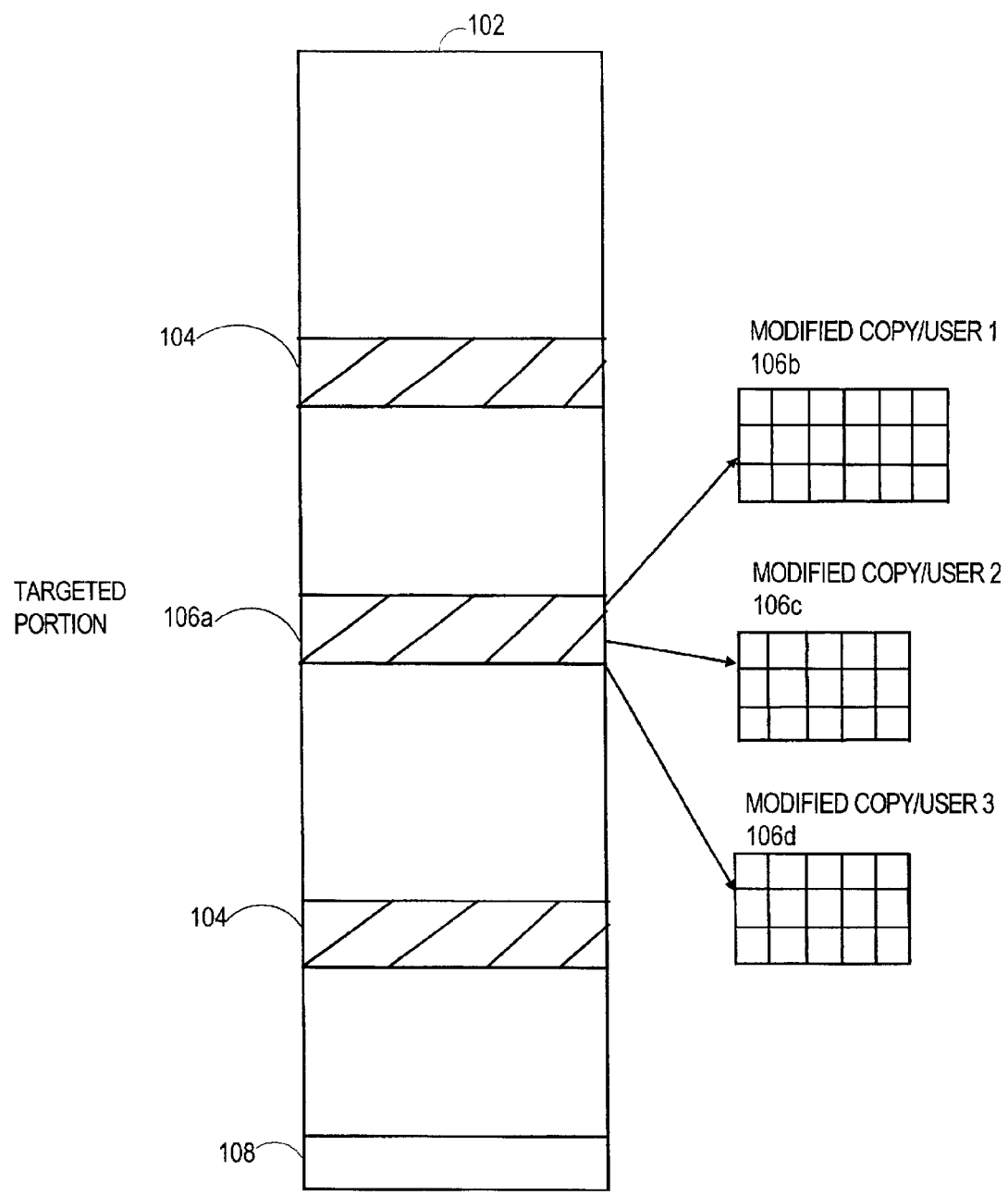
FIG. 1 illustrates how data is copied to preserve the memory state of a software program before being modified in response to a technique for debugging and testing of potential solutions for a software program.

FIG. 1 illustrates how, using the techniques described herein, data is copied to preserve the memory state of a software program before being modified. For the purpose of explanation, it will be assumed that the software program is a database server. However, the present techniques are not limited to any particular type of program. A database administrator, for example, "freezes" a portion of a database to preserve the memory state of the database system. Preserving the database may include suspending a failed process within the database system. Various techniques may be used to freeze the state of a database server. One such technique is described in U.S. patent application Ser. No. 09/223,660 entitled "METHOD AND SYSTEM FOR DIAGNOSTIC PRESERVATION OF THE STATE OF A COMPUTER SYSTEM" filed by Wei Hu and Juan Loaiza on Dec. 30, 1998, the contents of which is incorporated herein by reference.

The act of preserving the database may be initiated by giving the software program an explicit "freeze" user command. Alternatively, the act of preserving the database may be initiated in response to an automatic trigger that fires when an error event is detected. The techniques described hereafter indicate how debugging and testing may be performed, even by multiple users concurrently, without changing any data in the preserved portion 102. Any operation that could cause any change within the preserved portion is disabled with respect to the preserved portion 102.

In one embodiment, the software program is a database server that is composed of a memory portion referred to as a "database instance", and a set of data on disk referred to as "datafiles". In addition, one database server may be shared in a hardware cluster with additional database instances residing on different nodes, but still sharing access to the same set of datafiles. Preferably, the database administrator will be able to issue a command to preserve only the database instance that has failed, thereby detaching the preserved database instance from the cluster membership. In such a situation, it is important to exercise care while using the preserved database instance in this state, and to not affect the integrity of the datafiles or other database instances. Preferably, a database administrator only uses such a detached preserved database instance for debugging and testing operations. Detaching a database instance from a cluster involves isolating the instance from the rest of the cluster using software and/or hardware means.

Secondary Software Programs

While the software program is preserved, debugging and or testing operations may begin. Debugging or testing may involve a second software program. The second software program may be a software patch that fixes a bug in the software program. Techniques are provided to allow for testing of the software patch without compromising the memory state of the original software program. Alternatively, the second software program may be a diagnostic tool for debugging the software program. Any such second software program is herein generally referred to as a "secondary" software program. FIG. 1 shows the preserved portion 102 having segments of data. These segments of data are typically pages of memory. Assume that a user has written a secondary software program that is either a diagnostic tool or a potential patch the software program. The user may then compile and dynamically link the secondary software program to the original software program. Many operating systems provide for the compilation and dynamically linkage of separate software programs.

Assume that when the user executes the secondary software program, segments of the preserved portion 102 are accessed. For example, execution of the secondary results in a read operation that accesses data 104. The execution of the second software program may also call for a write operation to be performed on some data within the preserved portion 102. The data within the reserved portion that is targeted by the write operation is referred to herein as targeted data 106*a*. In response to an attempt to perform a write operation on data within the targeted data 106*a*, a copy is made of the targeted data 106*a*. The actual modification that would have been made to the targeted data 106*a* is instead made to the copy, creating a modified copy 106*b*. In one embodiment, the modified copy 106*b* is a copy-on-write page of memory.

In subsequent operations, relative to the execution of the software program, the modified copy 106*b* takes the place of the targeted data 106*a* Thus, if the execution of the secondary software program involves a subsequent read operation of targeted data 106*a*, the read operation would be performed on the modified copy 106*b*. Similarly, if the execution of the secondary software program would involve further modification to the targeted data 106*a*, the modification would once again be performed on the modified copy 106*b*.

For simplification purposes, FIG. 1 shows a scenario in which the target portion 206*a* includes only one segment. Therefore, a modified copy 106*b* has been made of only one target portion 106*a*. However, the execution of the secondary software program may actually involve modifications to many areas of a software program, and therefore cause the generation of modified copies of a multitude of segments.

In one embodiment, the memory segments of the preserved portion 102 are pages in memory. Preferably, a page map is used to keep track of all the pages of the modified copies for each user. For example, the modified copy 106*b* may be a copy-on-write page, the address of which is kept in a page map. Using this copying technique, the original preserved portion 102 of the software program is unaltered. The page mapping software and/or hardware ensures that, for the user that caused creation of the modified page, the modified page is mapped at the same virtual address as the original page, thus preserving the integrity of data structure references, indices, and pointers. The modified page is a modified copy of the original page, and the user that caused the creation of the modified page has a private view of the modified page. Such modified pages are herein referred to as "view private" modified pages.

The modified copies for a user may be discarded at anytime. Thus, a fresh testing and debug session may be initiated at any time using the preserved portion 102 and the =aforementioned copying technique.

Maintaining Per-User Modification Data

According to one embodiment, a separate set of modified copies are maintained for each user, based on the modifications made by that user. Specifically, each user sees (1) the modified copies that have been generated in response to the execution of secondary software programs executed by that user, and (2) the preserved portions of the software program that have not been modified in response to the execution of secondary software programs initiated by that user. The modified copies may be managed in a view private fashion using any one of a number of techniques, including page mapping software and hardware techniques.

Consequently, multiple programmers may debug and test potential solutions to problems in the software program concurrently, independently, and privately. The debug and testing progress of one programmer will not affect the debug and testing progress of another programmer. Accordingly, any number of debug and testing sessions may be generated and later destroyed. Such multiple-session debugging and testing should lead to a relatively quick and comprehensive assessment of the failure and testing of various potential solutions to the failure. For example, in FIG. 1, in response to compiling, dynamically linking and executing software program 1, which is a secondary software program, a user 1 modifies 106*a* and 106*b* is created. In response to compiling, dynamically linking and executing software program 2, which is another secondary software program that is distinct from software program 1, a user 2 modifies 106*a* and 106*c* is created. User 1 is unable to see the changes in 106*c*, and user 2 is unable to see the changes in 106*b*.

Sharing Secondary Programs

In addition, if user 1 wishes to share software program 1, user 1 may provide access to software program 1 by publishing a symbolic name associated with software program 1 in slot 108 of FIG. 1. Multiple users may concurrently, independently, and privately execute software program 1 by using the corresponding symbolic name that is published in the preserved portion of the software program. For example, in response to user 3 concurrently, independently, and privately executing software program 1, 106d in FIG. 1 is created. Because modified copies may be managed in a view private fashion, user 3 is unable to see the changes in either 106b or 106c.

Multiple Secondary Programs in a Single Session

One debug and testing session can be used to execute various secondary software programs that are separate from the original software program, which is being debugged. The programmer of a particular debug and testing session has a private view of the original software program, which is being debugged, in a privately modified state. This privately modified state is a side-effect of the aforementioned copying technique. In the case of a secondary software program that is a diagnostic tool, extensive exploration of the privately viewed data has the benefit of extracting valuable state that may point to the problem. In other words, the privately viewed data may be extensively explored and modified without fear of altering the preserved portion 102, which represents the original data. In the case of a secondary software program that is a potential solution to a problem in the original software program, testing of the potential solution may be safely performed before publishing and or permanently adopting the potential solution.

Where the software program is a database system, the debugging and testing may be performed, at least in part, by executing various secondary software programs that have been separately compiled and dynamically linked to the software program that is being debugged. The secondary software programs are executed using existing shared database state (i.e., the preserved portion 102) and the aforementioned copy-on-write technique. Additionally, the secondary software programs may be shared with multiple concurrent users by publishing, in the preserved portion, a corresponding symbolic name associated with the secondary software program.

FIG. 1 is an illustration of the privately viewed data of a debug and testing session at a particular point in time. Thus, at a particular point in time, a programmer, such as user 1, sees the preserved portion 102, minus the targeted data 106a, plus the modified copy 106b.

Preserving Persistent Data

In another embodiment, the software program is a database system that has persistent structures, such as persistent database tables. Persistent structures could be on disk or, in a multiple node system, reside in database instances on other nodes. For example, in a parallel server configuration, the persistent structures needed for debugging could reside on other servers. The execution of a secondary software program may call for accessing data, such as a persistent structure, that is outside the current database instance being debugged. For such data that resides outside the database instance being debugged, it is preferable to mount the data in a read-only mode into the database prior to performing debug and testing operations. Such a mounting step facilitates reads from outside data, such as persistent database tables. Debug and testing operations cannot write to the read-only data, and therefore will not make changes to the original persistent structures. Further, when any operation attempts to write to the read-only data, the debug and testing system preferably produces a logical error message, which the debug and testing system makes known to the user.

After copying outside data into the database in a read-only mode, outside data may be treated as part of the preserved portion 102. That is, a user is allowed to perform operations that modify the data, but those operations cause the creation of separate modified copies, and leave the original data intact. Thus, an embodiment of the present invention is applicable to debugging a database and testing of potential solutions to problems in the database where execution of secondary software programs call for accessing data that is outside the current database instance.

The Debugging Operation

Figure 2:
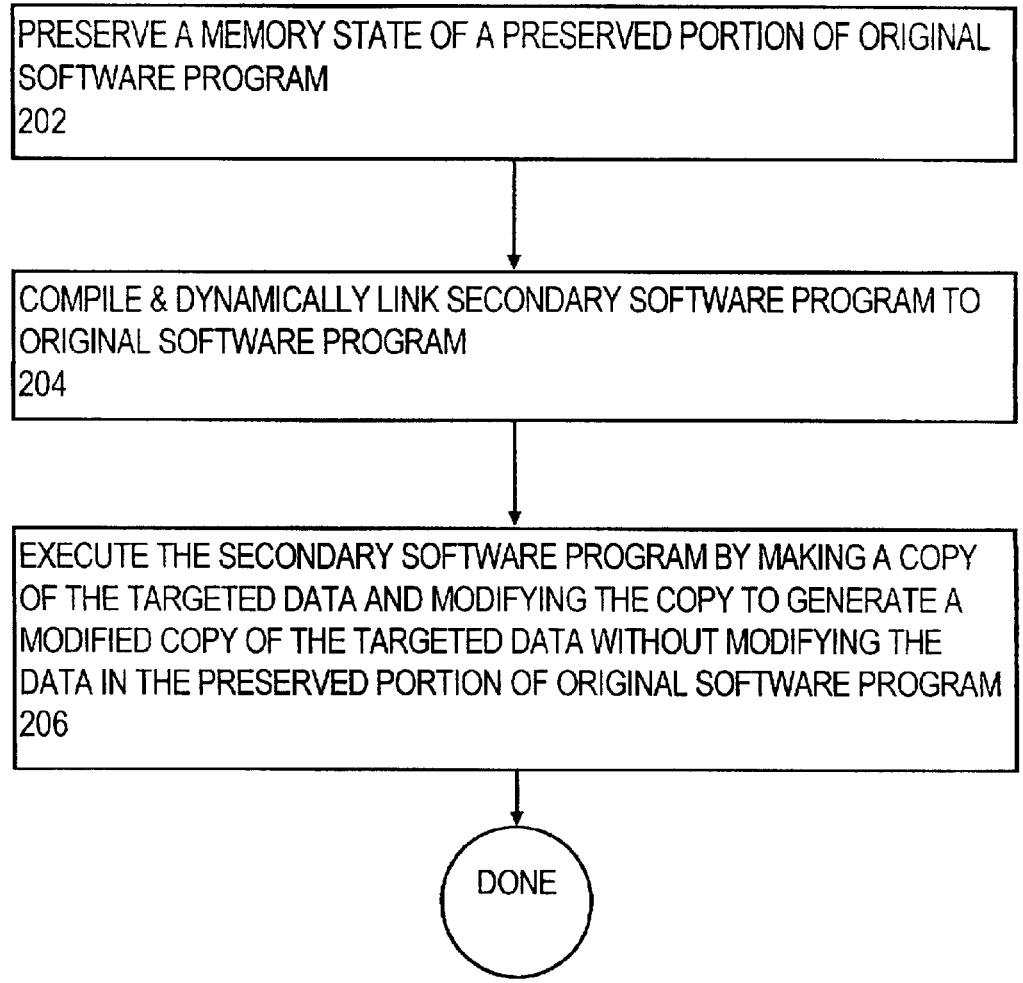
FIG. 2 is a flowchart of a technique that allows for non-intrusive debugging and testing of potential solutions for a software program.

FIG. 2 is a flowchart of a debug and testing technique that allows for non-intrusive debugging of a software program as well as testing potential solutions to problems in the software program. At block 202, a memory state of a preserved portion of the software program is preserved. As mentioned in the discussion with reference to FIG. 1, preserving the memory state may include suspending an application that has failed. At block 204, a secondary software program is compiled and dynamically linked to the original software program. At block 206, the secondary software program is executed causing the creation of a copy of targeted data 106a, if the execution of the secondary software program would normally cause modification to targeted data 106a in the portion of the software program that is being preserved.

Hardware Overview

Figure 3:
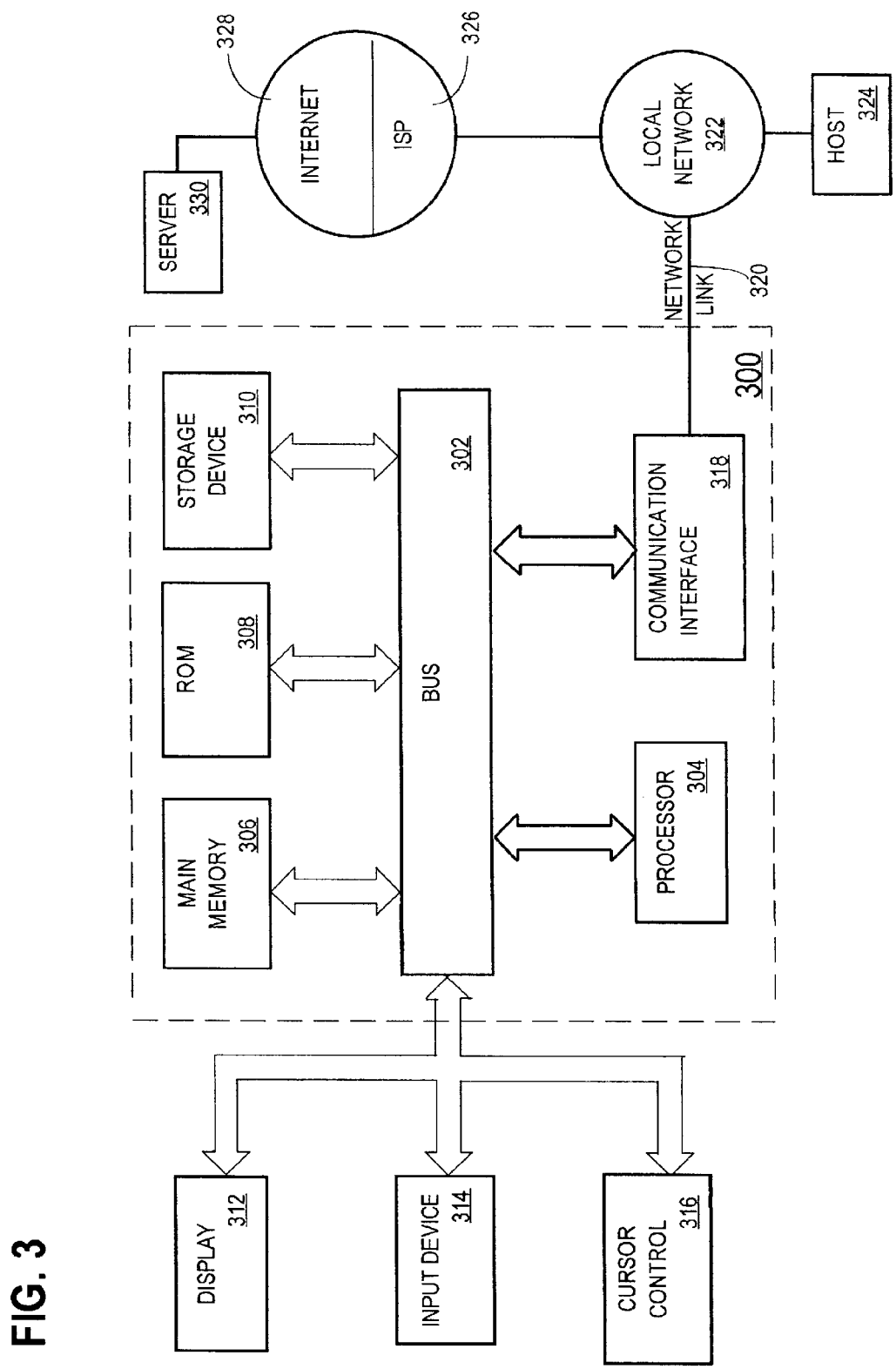
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

CONCLUSION

Techniques are described above for debugging a software program and for testing potential solutions to problems in the software program. In a preferred embodiment, the software program is preserved before debug and testing operations are performed on the software program. A secondary software program, which may either be a diagnostic tool or a potential solution to problems in the software program, is compiled and dynamically linked to the software program. A copy-on-write step is performed on accessed data that is to be modified as a result of executing the secondary software program. During the debug and testing process, modifications are made to the copied data of the software program, and not to the preserved portion 102. The secondary software program may be shared with other concurrent users of the software program by publishing, in the preserved portion 102, a corresponding symbolic name associated with the secondary software program. While the above description provides a database system as an example of a software program, the present invention generally applies to all software programs.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of debugging a first software program, the method comprising the steps of:

preserving a memory state of a preserved portion of the first software program;

dynamically linking a second software program to the first software program without deallocating from volatile memory the first software program;

executing the second software program; and if execution of the second software program would otherwise cause modification to targeted data that is in the preserved portion of the first software program, then making a copy of the targeted data and modifying the copy of the targeted data to generate a modified copy of the targeted data without modifying the targeted data that is in the preserved portion of the first software program.

2. The method of claim 1, further comprising the steps of:
publishing in the preserved portion of the first software program a corresponding symbolic name associated with the second software program; and
multiple users accessing the second software program is accessed through the corresponding symbolic name.

3. The method of claim 1, wherein the first software program is a database system.

4. The method of claim 1, wherein the step of preserving a memory state further includes the step of suspending a failed application of the database system.

5. The method of claim 1, further including the step of, in response to a subsequent attempt to access the targeted data in the preserved portion of the first software program, accessing the modified copy of the targeted data.

6. The method of claim 5, wherein the steps of dynamically linking and executing are initiated by a particular user, and wherein the step of accessing the modified copy occurs only if that particular user initiates the subsequent attempt to access the targeted data.

7. The method of claim 1, wherein:
the steps of dynamically linking and executing the second software program are performed by a first user;
the modified copy is a first modified copy of the targeted data; and
the method further comprises the steps of:
after the first modified copy has been created for the first user, a second user executing performing an operation which, when executed, would cause modification to the targeted data in the preserved portion; and
performing the operation by making a second copy of the targeted data and modifying the second copy to generate a second modified copy of the targeted data, the second modified copy being separate from the first modified copy and from the preserved portion.

8. The method of claim 7, further comprising the steps of:
after the first and second modified copies have been created for the first user and second user respectively, a third user dynamically linking and executing a third software program which, when executed, would cause modification to the targeted data in the preserved portion; and
making a third copy of the targeted data and modifying the third copy to generate a third modified copy, the third modified copy being separate from the first modified copy, from the second modified copy, and from the preserved portion.

9. A computer-readable medium bearing instructions for debugging a first software program, the instructions arranged, when executed by one or more processors, to cause the one or more processors to perform the steps of:
preserving a memory state of a preserved portion of the first software program;
dynamically linking a second software program to the first software program without deallocating from volatile memory the first software program;
executing the second software program; and
if execution of the second software program would otherwise cause modification to targeted data that is in the preserved portion of the first software program, then making a copy of the targeted data and modifying the copy of the targeted data to generate a modified copy of the targeted data without modifying the targeted data that is in the preserved portion of the first software program.

10. The computer-readable medium of claim 9, further comprising the steps of:
publishing in the preserved portion of the first software program a corresponding symbolic name associated with the second software program; and
multiple users accessing the second software program is accessed through the corresponding symbolic name.

11. The computer-readable medium of claim 9, wherein the first software program is a database system.

12. The computer-readable medium of claim 9, wherein the step of preserving a memory state further includes the step of suspending a failed application of the database system.

13. The computer-readable medium of claim 9, further including the step of, in response to a subsequent attempt to access the targeted data in the preserved portion of the first software program, accessing the modified copy of the targeted data.

14. The computer-readable medium of claim 13, wherein the steps of dynamically linking and executing are initiated by a particular user, and wherein the step of accessing the modified copy occurs only if that particular user initiates the subsequent attempt to access the targeted data.

15. The computer-readable medium of claim 9, wherein:
the steps of dynamically linking and executing the second software program are performed by a first user;
the modified copy is a first modified copy of the targeted data; and
the method further comprises the steps of:
after the first modified copy has been created for the first user, a second user executing performing an operation which, when executed, would cause modification to the targeted data in the preserved portion; and
performing the operation by making a second copy of the targeted data and modifying the second copy to generate a second modified copy of the targeted data, the second modified copy being separate from the first modified copy and from the preserved portion.

16. The computer-readable medium of claim 15, further comprising the steps of:
after the first and second modified copies have been created for the first user and second user respectively, a third user dynamically linking and executing a third software program which, when executed, would cause modification to the targeted data in the preserved portion; and
making a third copy of the targeted data and modifying the third copy to generate a third modified copy, the third modified copy being separate from the first modified copy, from the second modified copy, and from the preserved portion.

17. An apparatus for debugging a first software program, wherein the apparatus comprises a memory storing one or more instructions which, when executed by one or more processors, cause the one or more processors to perform the steps of:
preserving a memory state of a preserved portion of the first software program;

dynamically linking a second software program to the first software program without deallocating from volatile memory the first software program;

executing the second software program; and if execution of the second software program would otherwise cause modification to targeted data that is in the preserved portion of the first software program, then making a copy of the targeted data and modifying the copy of the targeted data to generate a modified copy of the targeted data without modifying the targeted data that is in the preserved portion of the first software program.

18. The apparatus of claim 17, wherein the memory includes one or more additional instructions which, when executed by the one or more processors, cause the one or more processors to perform the additional steps of:

publishing in the preserved portion of the first software program a corresponding symbolic name associated with the second software program; and multiple users accessing the second software program is accessed through the corresponding symbolic name.

19. The apparatus of claim 17, wherein the first software program is a database system.

20. The apparatus of claim 17, wherein the step of preserving a memory state further includes the step of suspending a failed application of the database system.

21. The apparatus of claim 17, wherein the memory includes one or more additional instructions which, when executed by the one or more processors, cause the one or more processors to perform the additional step of, in response to a subsequent attempt to access the targeted data in the preserved portion of the first software program, accessing the modified copy of the targeted data.

22. The apparatus of claim 21, wherein the steps of dynamically linking and executing are initiated by a particular user, and wherein the step of accessing the modified copy occurs only if that particular user initiates the subsequent attempt to access the targeted data.

23. The apparatus of claim 17, wherein:

the steps of dynamically linking and executing the second software program are performed by a first user;

the modified copy is a first modified copy of the targeted data; and wherein the memory includes one or more additional instructions which, when executed by the one or more processors, cause the one or more processors to perform the additional steps of:

after the first modified copy has been created for the first user, a second user executing performing an operation which, when executed, would cause modification to the targeted data in the preserved portion; and performing the operation by making a second copy of the targeted data and modifying the second copy to generate a second modified copy of the targeted data, the second modified copy being separate from the first modified copy and from the preserved portion.

24. The apparatus of claim 23, wherein the memory includes one or more additional instructions which, when executed by the one or more processors, cause the one or more processors to perform the additional steps of:

after the first and second modified copies have been created for the first user and second user respectively, a third user dynamically linking and executing a third software program which, when executed, would cause modification to the targeted data in the preserved portion; and making a third copy of the targeted data and modifying the third copy to generate a third modified copy, the third modified copy being separate from the first modified copy, from the second modified copy, and from the preserved portion.

* * * * *